United States Patent
Gentile

(10) Patent No.: US 10,657,946 B2
(45) Date of Patent: May 19, 2020

(54) DEVICE FOR ABSORBING SOUND WITHIN THE CABIN OF VEHICLE

(71) Applicant: Edward Gentile, Valley Stream, NY (US)

(72) Inventor: Edward Gentile, Valley Stream, NY (US)

( * ) Notice: Subject to any disclaimer, the term of this patent is extended or adjusted under 35 U.S.C. 154(b) by 455 days.

(21) Appl. No.: 15/435,324

(22) Filed: Feb. 17, 2017

(65) Prior Publication Data

US 2017/0243573 A1 Aug. 24, 2017

Related U.S. Application Data

(60) Provisional application No. 62/297,211, filed on Feb. 19, 2016.

(51) Int. Cl.
*G10K 11/168* (2006.01)
*B32B 27/40* (2006.01)
(Continued)

(52) U.S. Cl.
CPC .............. *G10K 11/168* (2013.01); *B32B 3/30* (2013.01); *B32B 5/18* (2013.01); *B32B 5/32* (2013.01); *B32B 7/12* (2013.01); *B32B 27/065* (2013.01); *B32B 27/40* (2013.01); *B32B 37/06* (2013.01); *B60R 13/083* (2013.01); *B32B 2037/1253* (2013.01); *B32B 2037/243* (2013.01); *B32B 2250/03* (2013.01); *B32B 2255/102* (2013.01); *B32B 2255/26* (2013.01); *B32B 2266/0264* (2013.01); *B32B 2266/0278* (2013.01); *B32B 2266/06* (2013.01); *B32B 2305/022* (2013.01); *B32B 2305/72* (2013.01); *B32B 2307/102* (2013.01); *B32B 2307/72* (2013.01); *B32B 2307/732* (2013.01); *B32B 2309/02* (2013.01); *B32B 2309/04* (2013.01); *B32B 2327/06* (2013.01); *B32B 2367/00* (2013.01); *B32B 2375/00* (2013.01); *B32B 2605/003* (2013.01)

(58) Field of Classification Search
CPC .... G10K 11/162; G10K 11/168; B32B 27/40; B32B 27/065; B32B 27/06; B60R 13/083; B60R 13/0815; B60R 13/08
See application file for complete search history.

(56) References Cited

U.S. PATENT DOCUMENTS

| | | | | |
|---|---|---|---|---|
| 4,264,386 A | * | 4/1981 | Sears, Jr. | .............. B29C 51/145 156/79 |
| 4,379,190 A | * | 4/1983 | Schenck | .............. D06N 7/0071 428/95 |

(Continued)

*Primary Examiner* — Edgardo San Martin
(74) *Attorney, Agent, or Firm* — Andrew Morabito

(57) ABSTRACT

A sound absorbing mat comprising a first polyurethane open cell polyester layer, wherein the first polyurethane open cell polyester layer is at least one quarter of an inch thick, a polyvinyl chloride layer having a top surface and a bottom surface, wherein the polyvinyl chloride layer is at least a quarter inch thick and the bottom surface is fused to the first polyurethane open cell polyester, a second polyurethane open cell polyester layer having a top surface and a bottom surface, wherein the second polyurethane open cell polyester layer is at least three quarters of an inch and the bottom surface of the second polyurethane open cell polyester layer is fused with the top surface of the polyvinyl chloride layer, and a urethane layer, wherein the urethane layer is at least a quarter inch thick and is mated to the top surface of the second polyurethane open cell polyester layer.

13 Claims, 1 Drawing Sheet

(51) Int. Cl.
  *B60R 13/08*   (2006.01)
  *B32B 27/06*   (2006.01)
  *B32B 5/18*    (2006.01)
  *B32B 5/32*    (2006.01)
  *B32B 7/12*    (2006.01)
  *B32B 37/06*   (2006.01)
  *B32B 3/30*    (2006.01)
  *G10K 11/162*  (2006.01)
  *B32B 37/12*   (2006.01)
  *B32B 37/24*   (2006.01)

(56) References Cited

U.S. PATENT DOCUMENTS

| | | | |
|---|---|---|---|
| 4,488,619 A | 12/1984 | O'Neil | |
| 4,579,764 A * | 4/1986 | Peoples, Jr. | B29C 44/1271 |
| | | | 264/243 |
| 5,094,318 A * | 3/1992 | Maeda | B32B 7/02 |
| | | | 181/290 |
| 5,334,806 A | 8/1994 | Avery | |
| 6,420,447 B1 | 7/2002 | Kittel et al. | |
| 7,972,676 B2 * | 7/2011 | Kleba | B32B 15/095 |
| | | | 156/242 |
| 7,987,645 B2 | 8/2011 | Tinianov | |
| 8,151,933 B2 * | 4/2012 | May | B60R 13/083 |
| | | | 181/284 |
| 8,960,366 B2 * | 2/2015 | Peskar | G10K 11/168 |
| | | | 181/229 |
| 9,093,060 B2 | 7/2015 | Mori et al. | |
| 9,902,127 B2 * | 2/2018 | Peskar | A61F 11/14 |
| 2005/0126848 A1 | 6/2005 | Siavoshai et al. | |
| 2006/0289231 A1 | 12/2006 | Priebe et al. | |
| 2008/0050574 A1 | 2/2008 | Lovell | |
| 2011/0061324 A1 | 3/2011 | Tinianov | |
| 2011/0165429 A1 | 7/2011 | Tinianov et al. | |

* cited by examiner

DEVICE FOR ABSORBING SOUND WITHIN THE CABIN OF VEHICLE

BACKGROUND OF THE INVENTION

The present invention relates to a sound absorbing mat, and more particularly to a sound absorbing mat for vehicles wherein the mat does not need to be adhered to the interior surfaces of the vehicle.

Current sound deadening, noise reducing or damping products are placed underneath the vehicles carpet, or under a part of the vehicle designed to hide or cover up a portion of the vehicle that's not aesthetically pleasing (i.e. plastic or carpeted like panels etc.). The reason for this is that other sound deadening, noise reducing or damping products need to be affixed or bonded to a portion of the vehicle in order to work. Typically it's bonded to the bare metal of the vehicle.

In order to place other sound deadening, noise reducing or damping products underneath the vehicles carpet, or under a part of the vehicle designed to hide or cover up a portion of the vehicle that's not aesthetically pleasing, parts of the interior need to be removed and or disassembled. All of this requires time and labor. Other sound deadening, noise reducing or damping products are glued or bonded to the vehicles surface. This makes for a one-time application.

Therefore there is a need for a sound absorbing product that does not require the removal of the interior of the vehicle, and does not require the use of adhesives to bond the product to the vehicle.

SUMMARY

In one embodiment of the present invention a sound absorbing mat for use within the interior compartment of a vehicle, comprising a first polyurethane open cell polyester layer, wherein the first polyurethane open cell polyester layer is at least one quarter of an inch thick; a polyvinyl chloride layer having a top surface and a bottom surface, wherein the polyvinyl chloride layer is at least a quarter inch thick and the bottom surface is fused to the first polyurethane open cell polyester; a second polyurethane open cell polyester layer having a top surface and a bottom surface, wherein the second polyurethane open cell polyester layer is at least three quarters of an inch thick and the bottom surface of the second polyurethane open cell polyester layer is fused with the top surface of the polyvinyl chloride layer; and a urethane layer, wherein the urethane layer is at least a quarter inch thick and is mated to the top surface of the second polyurethane open cell polyester layer.

In an additional exemplary embodiment, a method of forming a sound absorbing mat for use within the interior compartment of a vehicle, the method comprising: coating a top surface of a first polyurethane open cell polyester layer with a placing a quantity of liquid polyvinyl chloride, wherein a second layer is formed and the second layer covers substantially all of the top surface of a first polyurethane open cell polyester layer; covering the second layer with a second polyurethane open cell polyester layer, wherein a mat is created and the second polyurethane open cell polyester layer covers substantially the entire exposed surface area of the second layer coated by the quantity of polyvinyl chloride; inserting the mat in an oven at a predetermined temperature for a predetermined timeframe, wherein the quantity of liquid polyvinyl chloride becomes a solid and fuses with the first polyurethane open cell polyester layer and the second polyurethane open cell polyester layer; placing a urethane layer on the mat; and rolling the mat with the urethane layer through a roller at a predetermined temperature, wherein the urethane layer is heated to a temperature that allows the urethane layer to fuse with the mat.

DETAILED DESCRIPTION OF THE INVENTION

Figure 1:
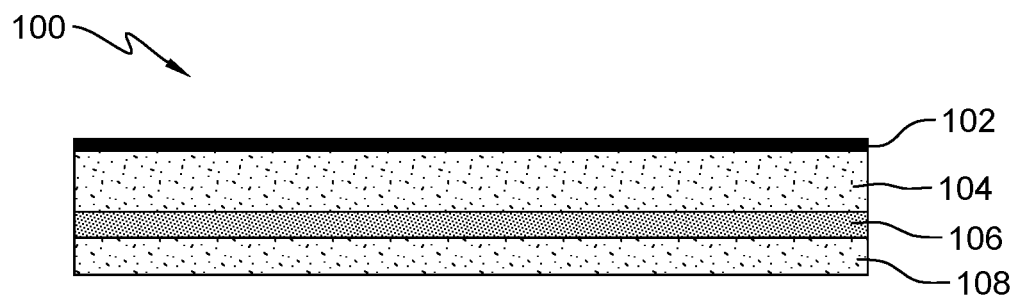
FIG. 1 depicts a side view of a sound absorbing mat, in accordance with one embodiment of the present invention.

The products of the present invention provide a mat that is used within the interior cabin of vehicle to reduce cabin noise for the occupants. The advantage of the present invention is that it does not require removing, lifting or dissembling the vehicles interior. It does not require to be affixed or boded to a portion of the vehicle. The invention is laid right on the vehicles exposed surface. This permits easy installation and removal of the invention.

The vehicle's interior surface in which the invention can be placed on top of can be virtually any surface within the vehicle. Some examples would be the vehicles carpet/rug, a section of the car that has a carpet or carpet like material constructed by the vehicles manufacture to aesthetically look pleasing, (i.e. cargo area or hatch back), the vehicles bare metal, a panel or part of the car that was constructed by the vehicles manufacture to aesthetically look pleasing, a panel or part of the car that was constructed by the vehicles manufacture hide a portion of the vehicle, its mechanical or electrical parts or wires that is not aesthetically pleasing. The invention is not limited to or restricted to these interior surfaces.

The advantage of the invention is that since there is no adhesive and because the invention is not bonded to the vehicle, the invention is removable and reusable. It can be used an infinite amount of times. The invention can be removed from one vehicle and used in another of the same type & model vehicle. Another advantage of being removable & reusable is for people who race their vehicles, and require noise reduction to prevent damage to their ears. Noise reduction, sound deadening & damping products are heavy and add weight to the vehicle. Weight is a racer's worst enemy. The invention can be easily removed on race day & re installed at the end of the day for the return trip home. It can be used with heavy machinery where the mats can be easily replaced when they are destroyed by the everyday wear and tear of construction.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein may also be used in the practice or testing of the present invention, the preferred methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

FIG. 1 depicts a side view of a sound absorbing mat, in accordance with one embodiment of the present invention. The sound absorbing mat 100 is comprised of four layers. The fourth layer 108 is a polyurethane open cell polyester foam. The third layer 106 is a polyvinyl chloride (PVC) polymer. The third player 106 is a polyurethane open cell polyether foam. The first layer 102 is a is urethane film.

The first layer 102 is made from a urethane film and is at least 0.118 inches thick or three (3) millimeters. The first layer 102 is a protective coating to reduce the damage to the layers concealed below due to the increased durability and lifetime of the sound absorbing mat 100. The fourth layers 108 may be thicker to provide additional protection for the sound absorbing mat 100. The first layer 102 extends somewhat greater than the entire surface of the second layer 104. The first layer 102 provides some sound absorption but is mainly used as a protective layer for the sound absorbing mat 100.

The second layer 104 is made of polyurethane open cell polyester and is at least three quarters (¾) of an inch thick to absorb the majority of the sound. The thickness of the second layer 104 is desired to be three quarters (¾) of an inch to absorb a majority of frequencies of sounds that are likely to enter the cabin of a vehicle. The second layer 104 functions mainly to absorb the airborne and structure borne sounds. The second layer 104 typically has a flat surface which is in contact with the third layer 106 but may have texture to assist in diffusion of the sounds through the third layer 106. The second layer 104 is also used to insulate the third layer 106. The polyurethane open cell polyester has a density of approximately 0.032 2 g/cm$^3$.

The third layer 106 is made of polyvinyl chloride and is used to mainly reflect and diffuse the sound. The third layer 106 is at least a quarter inch (¼) thick, but can be as thick as three-quarters (¾) thick. The third layer 106 starts in a liquid state and through a heating process is solidified directly onto the fourth layer 108 and the second layer 104. Due to the third layer 106 being a denser material than the rest of the layers, the third layer 106 is reduces the majority of the sound from entering the cabin of the vehicle. The second layer does this by reflecting the sound, diffusing the sound. Due to the second layering starting as a liquid before solidifying with the fourth layer 108 and the second layer 104, the surface of the fourth layer 108 may be shaped with grooves or notches that assist in diffusing a great portion of the sounds which is attempting to pass through the sound absorbing mat 100 and into the cabin of the vehicle. It is desired the PVC has a density between 1.3 g/cm$^3$ and 1.45 g/cm$^3$.

The fourth layer 108 is made from a polyurethane open cell polyester is a polymer composed of organic units joined by carbamate (urethane) links. The fourth layer 108 is preferably a quarter inch (¼) thick to provide a both a soft base so as to mold to any deformities on the surface of the cabin, but also to provide an initial layer to absorb the sound from the vehicle and also to absorb sounds which are reflected or defused from the third layer 106. The fourth layer 108 acts as a decoupling layer between the vehicle and the third layer 106. If the third layer 106 was separate, the third layer 106 may vibrate when in contact with the interior of the vehicle and create more noise through vibrations. The surface of the fourth layer 108 which is in contact with the third layer 106 may have grooves and notches which are designed to be filled by the third layer 106 when in the liquid state, so when hardened, the third layer 106 has a varying texture to further increase the sound that is reflected and absorbed back into the fourth layer 108 and absorbed. The contour of the layers is designed to disperse the sound waves of different frequencies. The polyurethane open cell polyester has a density of approximately 0.032 2 g/cm$^3$.

Since the first and third layers 102 and 106 are made from a molding step the thickness can be substantially controlled. Thus, there is less of an opportunity for certain areas of the sound absorbing mat 100 to be less effective at reducing the ability to reduce the interior noise of the vehicle. This also allows the surfaces of the first and third layers 102 and 106 to have specific and predetermined contours that are then incorporated into the third layer 106 when hardened. The contours can be, but not limited to egg carton shapes, plurality of triangles or wedges, or other know shapes or patterns that provide an increased absorption, deflection, and reflection of sounds at various frequencies. The third layer 106 starting as a liquid and being transformed to a solid has less control of the thickness and may vary slightly based while still performing the desired task of reducing sound within a vehicle.

The four layers are affixed together without the use of any adhesives through a multi-step process. The third layer 106 begins in a liquid state and is fused with the fourth layer 108 and the second layer 104 substantially simultaneously as the three layers are passed through an oven. The layers are in the oven for approximately fifteen (15) minutes. The oven operates at approximately three hundred and fifty degrees (350) Fahrenheit. Once the three layers pass through the oven, the third layer 106 has solidified and fused with the first and third layer 102 and 106 respectively forming a unitary element wherein each of the layers are substantially fused with the layers in which they encounter.

The second layer 102 will have filled in any texture or contours which were integrated into the surfaces of the first 102 and the third layers 106. The newly formed mat is then passed through a rolling device wherein the first layer 102 is pressed against the second layer 104 and due to the temperature of the roller which is approximately three hundred and fifty (350) degree Fahrenheit the first layer 102 is heated to a temperature at which the first layer 102 mates with the second layer 104. In some embodiments, the first layer 102 is melted into the second layer 104, wherein the two layers are merged together.

Figure 2:
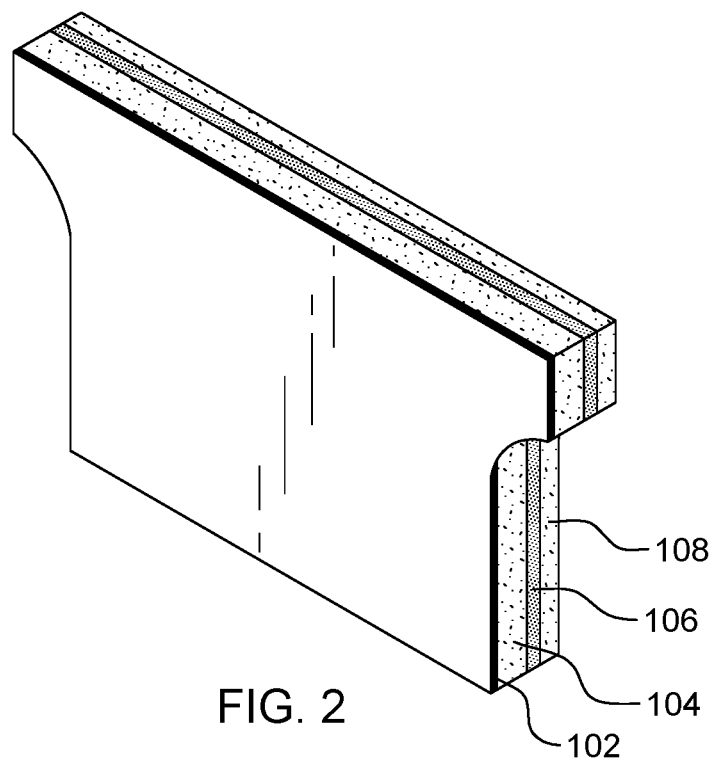
FIG. 2 depicts an isometric view of the sound absorbing mat, wherein the mat is shaped to fit in the trunk of a vehicle, in accordance with one embodiment of the present invention.

FIG. 2 depicts an isometric view of the sound absorbing mat 100, wherein the mat is shaped to fit in the trunk of a vehicle, in accordance with one embodiment of the present invention. The sound absorbing mat 100 is cut down to fit securing within the trunk, or along any portion of the interior of the cabin of the vehicle. The sound absorbing mat 100 may be sized and shaped to fit different vehicles, for example different car trunks, back seats, or front seats based on specific car models, years, and the like. The sound absorbing mat 100 may also be created in a roll wherein the user has the opportunity to cut or shape the mat 100 as they see fit.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

What is claimed is:

1. A sound absorbing mat for use within the interior compartment of a vehicle, comprising:
    a first polyurethane open cell polyester layer having a predefined contour, wherein the first polyurethane open cell polyester layer is at least one quarter of an inch thick, wherein the first polyurethane open cell polyester layer forms to the space of the interior compartment;
    a polyvinyl chloride, wherein the polyvinyl chloride is applied to and fuses with the first polyurethane open cell polyester, wherein the polyvinyl chloride takes on the contour of the first polyurethane open cell polyester layer once hardened and is substantially a quarter of an inch thick;
    a second polyurethane open cell polyester layer having a top surface and a bottom surface, wherein the bottom surface has a predetermined contour and the top surface is substantially smooth, wherein the second polyurethane open cell polyester layer is at least three quarters of an inch thick and the bottom surface of the second polyurethane open cell polyester layer is fused with the polyvinyl chloride before it is hardened; and
    a urethane layer having a grip surface, wherein the urethane layer is at least a quarter inch thick and is mated to the top surface of the second polyurethane open cell polyester layer.

2. The sound absorbing mat for use within the interior compartment of a vehicle of claim 1, wherein the first polyurethane open cell polyester layer has a thickness of approximately one quarter inches.

3. The sound absorbing mat for use within the interior compartment of a vehicle of claim 1, wherein the second polyurethane open cell polyester layer has a thickness of approximately three quarter of an inches.

4. The sound absorbing mat for use within the interior compartment of a vehicle of claim 1, wherein the polyvinyl chloride layer has a thickness of approximately one quarter of an inches.

5. The sound absorbing mat for use within the interior compartment of a vehicle of claim 1, wherein the urethane layer has a thickness of approximately three sixty-fourths of an inches.

6. The sound absorbing mat for use within the interior compartment of a vehicle of claim 1, wherein a top surface of the first polyurethane open cell polyester layer has a predetermined contour, so that when the polyvinyl chloride layer solidifies, the contours of the top surface are replicated in the polyvinyl chloride layer.

7. The sound absorbing mat for use within the interior compartment of a vehicle of claim 1, wherein a bottom surface of the second polyurethane open cell polyester layer has a predetermined contour, so that when the polyvinyl chloride layer solidifies, the contours of the bottom surface are replicated in the polyvinyl chloride layer.

8. A sound absorbing mat for use within the interior compartment of a vehicle, comprising:
    a first polyurethane open cell polyester layer having a first surface and a second surface, wherein the first surface has a contour to substantially match the interior compartment surface, and the second surface has a contour to increase sound deflection;
    a polyvinyl chloride applied to the seconds surface of the first polyurethane open cell polyester; and
    a second polyurethane open cell polyester layer having a top surface and a bottom surface, wherein the bottom surface of the second polyurethane open cell polyester layer is fused with the top surface of the polyvinyl chloride layer; and
    a urethane layer having a top side and a bottom side, wherein the bottom side is fused with the top surface of the second polyurethane open cell polyester layer and the top side is exposed to the interior compartment space.

9. The sound absorbing mat of claim 8, further comprising;
    a urethane layer, wherein the urethane layer is mated to the top surface of the second polyurethane open cell polyester layer.

10. The sound absorbing mat of claim 9, wherein the urethane layer, wherein the urethane layer is at least a quarter inch thick.

11. The sound absorbing mat of claim 8, wherein the first polyurethane open cell polyester layer is at least one quarter of an inch thick.

12. The sound absorbing mat of claim 8, wherein the polyvinyl chloride layer is at least a quarter inch thick.

13. The sound absorbing mat of claim 8, wherein the second polyurethane open cell polyester layer is at least three quarters of an inch thick.

* * * * *